US008247952B2

(12) United States Patent
Chang

(10) Patent No.: US 8,247,952 B2
(45) Date of Patent: Aug. 21, 2012

(54) WHEEL WITH PIEZOELECTRIC RING AND VEHICLE HAVING SAME

(75) Inventor: Kuo-Cheng Chang, Miao-Li Hsien (TW)

(73) Assignee: Foxsemicon Integrated Technology, Inc., Chu-Nan, Miao-Li Hsien (TW)

(*) Notice: Subject to any disclaimer, the term of this patent is extended or adjusted under 35 U.S.C. 154(b) by 0 days.

(21) Appl. No.: 13/237,962

(22) Filed: Sep. 21, 2011

(65) Prior Publication Data

US 2012/0074814 A1    Mar. 29, 2012

(30) Foreign Application Priority Data

Sep. 28, 2010  (TW) ................................ 99132748 A

(51) Int. Cl.
*H01L 41/08* (2006.01)
(52) U.S. Cl. ........................................................ 310/339
(58) Field of Classification Search ................... 310/329, 310/339
See application file for complete search history.

(56) References Cited

U.S. PATENT DOCUMENTS

| | | | | |
|---|---|---|---|---|
| 4,504,761 A * | 3/1985 | Triplett | | 310/339 |
| 6,992,423 B2 * | 1/2006 | Mancosu et al. | | 310/339 |
| 7,023,100 B2 * | 4/2006 | Vlad | | 290/1 R |
| 7,429,801 B2 * | 9/2008 | Adamson et al. | | 290/1 R |
| 7,781,942 B2 * | 8/2010 | Hatano | | 310/339 |
| 2005/0257609 A1 * | 11/2005 | Mancosu et al. | | 73/146 |
| 2006/0082258 A1 * | 4/2006 | Mancosu et al. | | 310/339 |
| 2009/0257139 A1 * | 10/2009 | Shiga | | 359/824 |
| 2010/0288046 A1 * | 11/2010 | Sy et al. | | 73/488 |
| 2011/0074564 A1 * | 3/2011 | Hirabayashi et al. | | 340/447 |

* cited by examiner

*Primary Examiner* — Mark Budd
(74) *Attorney, Agent, or Firm* — Altis Law Group, Inc.

(57) ABSTRACT

A wheel includes a rim and a tire. The rim includes a ring body defining a central axis, two flanges, and two piezoelectric rings. The flanges extend from the circumference of the ring body around the central axis. A first annular groove is defined in the circumference of each flange around the central axis. The piezoelectric rings are mounted in the respective first annular grooves and configured for producing electric power under pressure. The tire encloses the rim.

10 Claims, 3 Drawing Sheets

WHEEL WITH PIEZOELECTRIC RING AND VEHICLE HAVING SAME

BACKGROUND

1. Technical Field

The present disclosure relates to wheels, and particularly, to a wheel with piezoelectric rings and a vehicle having the same.

2. Description of Related Art

Many vehicles include wheels and electronic devices, such as radios, an air conditioner, and/or headlights. The electronic devices are usually powered by an internal rechargeable battery. However, the electric power of the battery is easily exhausted and it has to charge the battery frequently, which may consume more energy.

Therefore, it is desirable to provide a wheel with piezoelectric rings and a vehicle having the same, which can overcome or at least alleviate the above-mentioned problems.

DETAILED DESCRIPTION

Figure 1:
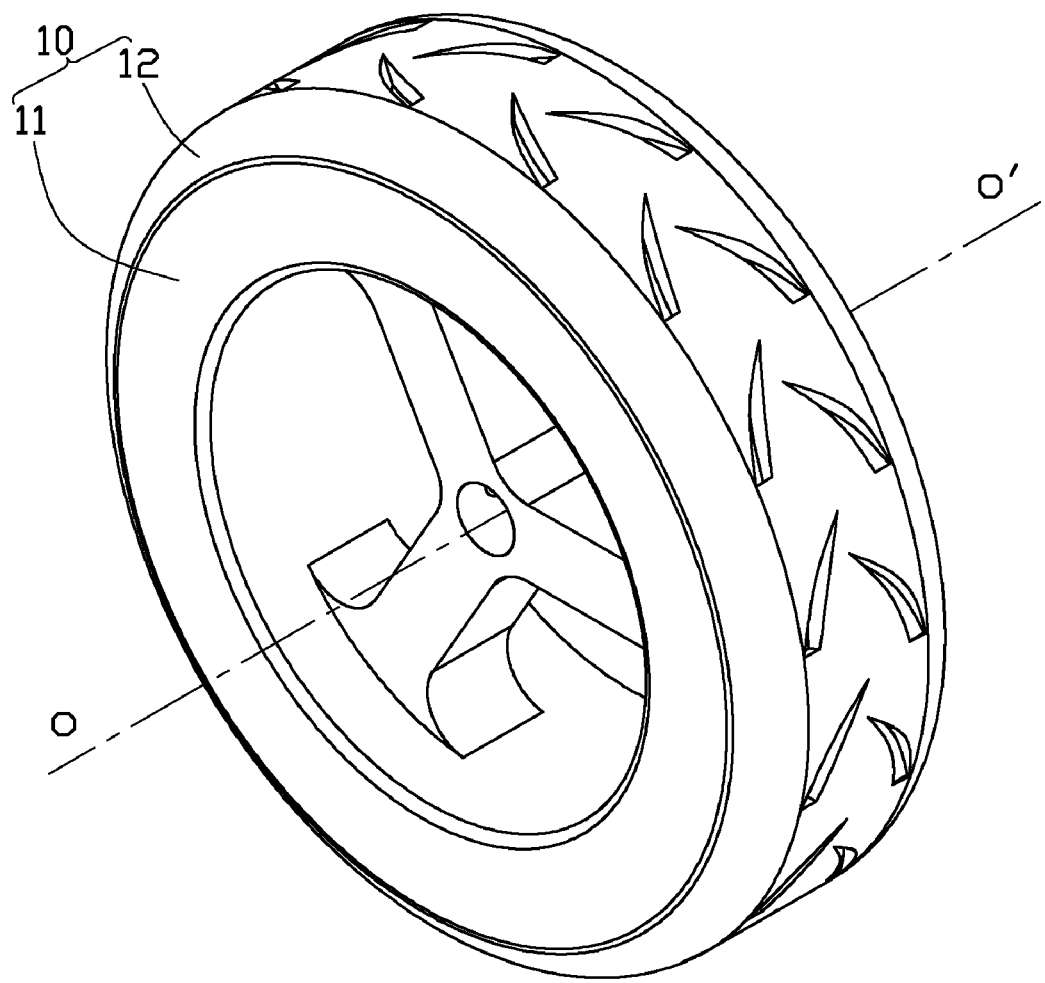
FIG. 1 is a schematic, isometric view of a wheel including a rim, according to an exemplary embodiment.

Referring to FIG. 1, a wheel 10, according to an exemplary embodiment, includes a rim 11, a tire 12, and an inner tube (not shown). The tire 12 covers the rim 11. The inner tube (not shown) is positioned between the rim 11 and the tire 12. The wheel 10 is a portion of a vehicle (not shown) and rolls when the vehicle moves.

Figure 2:
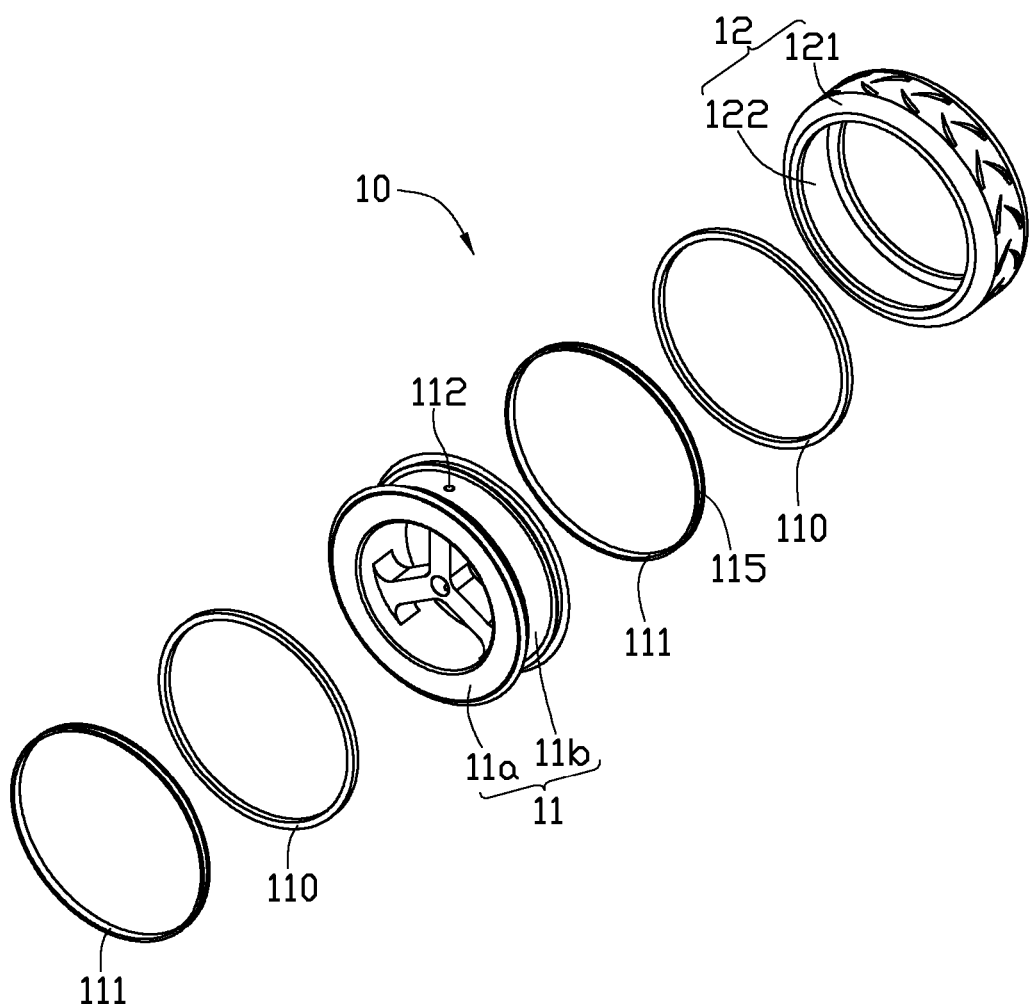
FIG. 2 is an exploded view of the wheel of FIG. 1.
Figure 3:
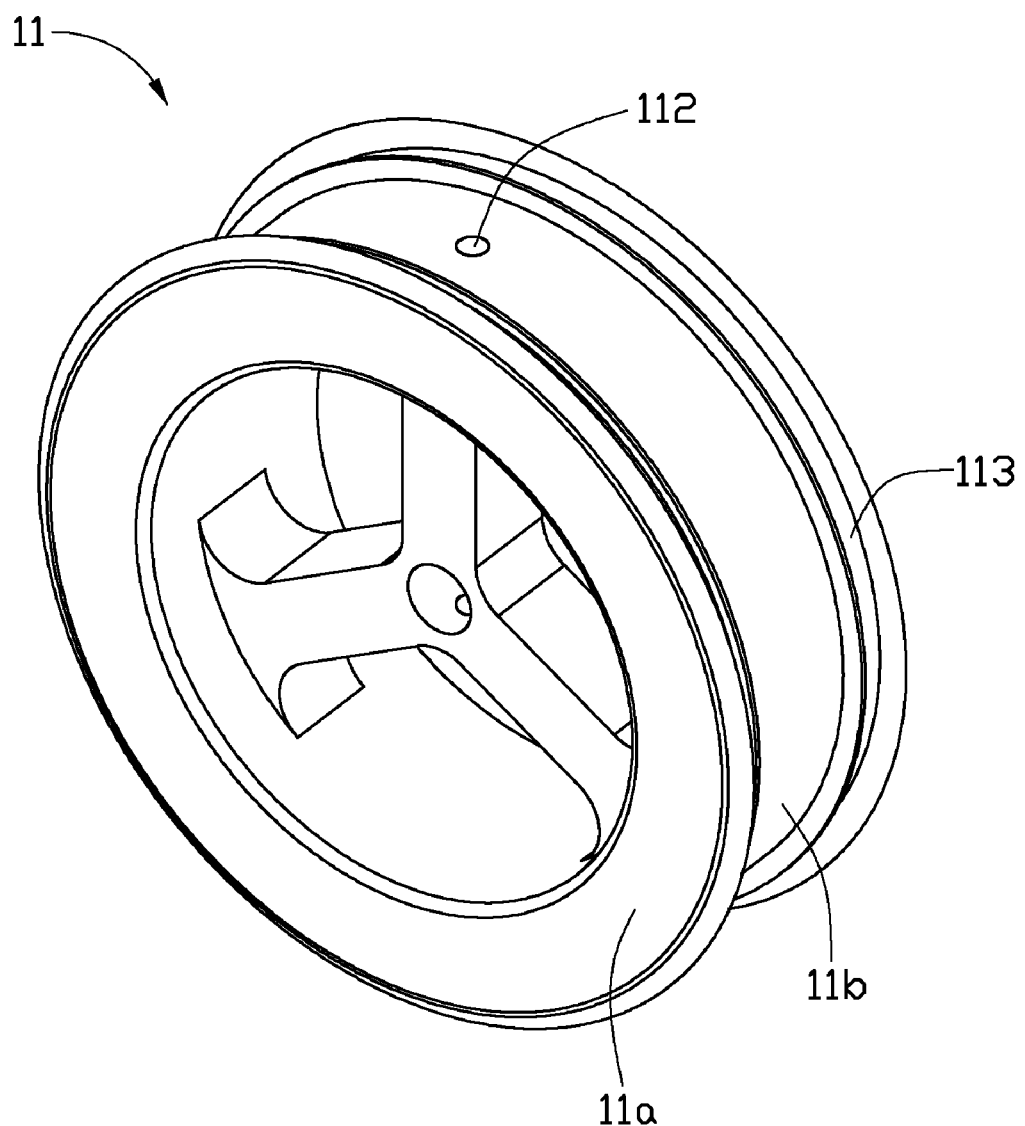
FIG. 3 is an enlarge view of the rim of FIG. 2.

Referring to FIGS. 2-3, the rim 11 includes a ring body 11b, two flanges 11a, two insulation rings 111, and two piezoelectric rings 110.

The ring body 11b defines a central axis OO' thereof. The central axis OO' coincides with a central axis of an axle where the wheel 10 is mounted. A through hole 112 is defined in a central portion of the circumference of the ring body 11b.

The two flanges 11a extend from the circumference of the ring body 11b around the central axis OO'. A first annular groove 113 is defined in the circumference of each flange 11a around the central axis OO'. In this embodiment, the ring body 11b and the two flanges 11a are made of metal.

The two insulation rings 111 are mounted in the respective first annular grooves 113. Each insulation ring 111 defines a second annular groove 115 in the circumference of the insulation ring 111 corresponding to the piezoelectric rings 110. Each of the insulation rings 111 is made of electric insulation material. In this embodiment, the insulation rings 111 may be made of rubber or plastic.

The two piezoelectric rings 110 are mounted in the respective second annular grooves 115. Wires (not shown) connected to the piezoelectric rings 110 pass through the through hole 112 to connect electronic devices or a storage battery in a vehicle (not shown). Each piezoelectric ring 110 is made of piezoelectric material, such as organic piezoelectric material, inorganic piezoelectric material, or compound piezoelectric material. In this embodiment, the organic piezoelectric material may be polyvinylidene fluoride. The inorganic piezoelectric material may be piezotransistor or piezoceramics. The piezotransistor includes quartz crystal, lithium gallium oxide, lithium germinate, lithium niobate and lithium tantalite. The piezoceramics includes barium titanate, barium zirconate titanate, modified barium zirconate titanate, and modified lead titanate. The compound piezoelectric material includes a polymer base, organic piezoelectric material and inorganic piezoelectric material. The organic piezoelectric material and the inorganic piezoelectric material are embedded in the polymer base.

In this embodiment, the thickness of each of the piezoelectric rings 110 is larger than the depth of each of the first annular grooves 113 and the second annular grooves 115. In other words, the piezoelectric rings 110 protrude from the corresponding first annular grooves 113 and the corresponding second annular grooves 115.

The tire 12 includes an outer surface 121 and an inner surface 122 opposite to the outer surface 121. The outer surface 121 is in contact with the ground. The inner surface 122 is in contact with the inner tube.

When the vehicle moves and the wheel 10 rolls, pressure generated by the ground will be applied to the piezoelectric rings 110. Then, the piezoelectric rings 110 will transform the mechanical energy to electric energy. The piezoelectric rings 110 will transmit the electric power to the electronic devices and/or the storage battery in the vehicle via wires. Thus, the shape change of the wheel 12 can provide additional electric energy for charging the battery and/or powering the electronic devices. Energy reuse can be achieved and additional energy consumption can be avoided.

In other embodiments, the vehicle may includes a storage battery (not shown) electrically connected to the piezoelectric rings 110 via wires. The piezoelectric rings 110 will transmit the electric power to the storage battery to be stored.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A wheel comprising:
   a rim comprising:
      a ring body defining a central axis thereof;
      two flanges extending from the circumference of the ring body around the central axis, a first annular groove defined in the circumference of each flange around the central axis;
      two piezoelectric rings mounted in the respective first annular grooves and configured for producing electric power under pressure; and
   a tire enclosing the rim.

2. The wheel as claimed in claim 1, further comprising two insulation rings mounted in the respective first annular grooves, wherein each insulation ring defines a second annular groove corresponding to the piezoelectric rings, the two piezoelectric rings are received in the respective second annular grooves.

3. The wheel as claimed in claim 2, wherein the thickness of each of the piezoelectric rings is larger than the depth of each of the first annular grooves and the second annular grooves.

4. The wheel as claimed in claim 3, wherein a through hole is defined in a central portion of the ring body for extending of wires therethrough.

5. The wheel as claimed in claim 3, wherein each piezoelectric ring is made of a material selected from the group consisting of organic piezoelectric material, inorganic piezoelectric material, and compound piezoelectric material.

6. A vehicle comprising:
   a battery; and
   a wheel comprising:
      a rim comprising:
         a ring body defining a central axis thereof;
         two flanges extending from the circumference of the ring body around the central axis, a first annular groove defined in the circumference of each flange around the central axis;
         two piezoelectric rings mounted in the respective first annular grooves and configured for producing electric power, the piezoelectric rings electrically connected to the battery; and
      a tire enclosing the rim.

7. The vehicle as claimed in claim 6, further comprising two insulation rings mounted in the respective first annular grooves, wherein each insulation ring defines a second annular groove corresponding to the piezoelectric rings, the two piezoelectric rings are received in the respective second annular grooves.

8. The vehicle as claimed in claim 7, wherein the thickness of each of the piezoelectric rings is larger than the depth of each of the first annular grooves and the second annular grooves.

9. The vehicle as claimed in claim 8, wherein a through hole is defined in a central portion of the ring body, wires passing through the through hole and connecting the piezoelectric rings to the battery.

10. The vehicle as claimed in claim 9, wherein each piezoelectric ring is made of a material selected from the group consisting of organic piezoelectric material, inorganic piezoelectric material, and compound piezoelectric material.

* * * * *